United States Patent Office 3,278,585
Patented Oct. 11, 1966

3,278,585
PROCESS FOR ESTERIFICATION OF SECONDARY ALCOHOLS CONTAINING AN ETHER GROUP BY REACTION IN THE PRESENCE OF A CATION EXCHANGE RESIN CATALYST
Marion A. Baker, Ardsley, N.Y., and Ronald L. Friedman, Hazlet, and William J. Raab, Berkeley Heights, N.J., assignors to Shell Oil Company, New York, N.Y., a corporation of Delaware
No Drawing. Filed Aug. 8, 1962, Ser. No. 215,511
7 Claims. (Cl. 260—473)

This invention relates to a process for esterifying alcohols with carboxylic acids. More particularly, it relates to an improved process for esterifying secondary alkanols with carboxylic acids in the presence of certain novel esterification catalysts.

INTRODUCTION

While the preparation of carboxylic acid esters of primary alcohols by direct esterification of the alcohol with the acid is a conventional chemical operation, the preparation of secondary alcohols is not as readily accomplished. Secondary alcohols as a class are more sensitive than primary alcohols to dehydrative attack by conventional acid catalysts. Indeed, some secondary alcohols readily decompose in the presence of strong acids such as sulfuric or hydrochloric acid. The esterification of secondary alcohols by conventional methods is therefore associated with comparatively low and uneconomical yields of product ester.

OBJECTS

It is an object of the present invention to provide a catalytic process for the esterification of alcohols. Another object is the provision of a process for the esterification of secondary alcohols with carboxylic acids. The esterification of such alcohols in the presence of certain novel metal salts of acidic ion-exchange resins is yet another object of the invention. Novel ether esters produced by the process of the invention are other objects of the invention. Other objects will be apparent from the following detailed description of the process of the invention.

STATEMENT

The process of the invention comprises reacting together in liquid phase an alkanol and a carboxylic acid or anhydride thereof in the presence of the metal salt of an acidic solid ion exchange resin.

DESCRIPTION

Hydroxy compounds

In the process of the invention, an alkanol is reacted in liquid phase with an organic carboxylic acid or anhydride in the presence of a particular metal salt catalyst. By alkanol is meant a saturated hydrocarbon having at least one hydroxyl directly attached to a carbon atom. Preferred alkanols are primary and secondary monohydric alkanols of up to 10 carbon atoms, e.g., methanol, ethanol, n-propanol, isopropanol, n-butanol, sec-butanol, isobutanol, n-pentanol, isopentanol, cyclopentanol, n-hexanol, cyclohexanol, octanol, methyl isobutyl carbinol and the like. The process of the invention is surprisingly efficacious with secondary alkanols, which are difficult to esterify with carboxylic acids in other ways.

The alkanols of the invention may have a plurality of hydroxyl groups, preferably no more than three. Examples of polyhydric alcohols include ethylene glycol; propylene glycol; trimethylene glycol; 1,6-hexanediol; hexylene glycol; 1,2,6-hexanetriol; glycerol; 1,5-pentanediol; 1,3,5-pentanetriol; 1,2,3,4-butanetetrol; sorbitol; and the like. In addition to having hydroxyl groups, the alkanols may also have such other non-interfering functional groups as ether and carbonyl linkages. Examples of operative compounds having both hydroxyl and ether functions are diethylene glycol, triethylene glycol, dipropylene glycol, glycerol monomethyl ether, glycerol monoethyl ether, and the like, while compounds having both hydroxyl and carbonyl functions are represented by such hydroxy ketones as dihydroxy acetone and diacetone alcohol. Most reactive hydroxylic compounds are those having up to 8 carbon atoms, and these are therefore preferred.

Carboxylic acids

Reacted in the process of the invention with the hydroxylic compounds described are organic carboxylic acids having at least one carboxyl group

attached to an organic radical, or their anhydrides. Particularly preferred as carboxylic acids are those alkanoic acids of up to 8 carbon atoms wherein the only functional group is the carboxyl substituent. Exemplary of such acids are acetic acid, propionic acid, butyric acid, isobutyric acid, caprylic acid, valeric acid, and the like. Unsaturated acids, such as acrylic acid, crotonic acid, vinylacetic acid, methacrylic acid and the like, are also effective, as are aromatic acids such as benzoic acid, phenylacetic acid, hydrocinnamic acid, cinnamic acid, phenylpropiolic acid, toluic acid and the like. These monocarboxylic acids are those of the formula

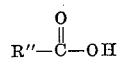

wherein R″ is the monovalent organic radical of the acids described.

The process of the invention may also be employed for the esterification of polycarboxylic acids such as oxalic acid; malonic acid; succinic acid; glutaric acid; adipic acid; sebacic acid; phthalic acid; isophthalic acid; trimellitic acid; pyromellitic acid; 1,2,3,4-butane-tetracarboxylic acid; fumaric acid; maleic acid; and their anhydrides. The acids may also contain non-interfering functional groups such as ether and ester groups and halogens. Such acids include trifluoroacetic acid, fluoroacetic acid, chloroacetic acid, alpha-chloropropionic acid, methoxyacetic acid, beta-ethoxypropionic acid, p-chlorobenzoic acid, and 2,4-dichlorophenoxyacetic acid. Preferred acids are those of up to 8 carbon atoms.

Instead of the acids themselves, their anhydrides may be employed in the esterification process described. Exemplary of such anhydrides are acetic anhydride, propionic anhydride, butyric anhydride, maleic anhydride, stearic anhydride, succinic anhydride, benzoic anhydride, phthalic anhydride, pyromellitic dianhydride, naphthalic anhydride, and their halogenated and etherified analogs.

While mono- and polycarboxylic acids and anhydrides may be employed in the esterification process of the invention, the preferred embodiments are those wherein the acid reactant is that of an acid having no more than 2 carboxyl groups.

Process conditions

The alcohol and the acid or anhydride described are reacted together in liquid phase in the presence of the particular metal salt catalysts of the invention. The reaction may conveniently be conducted in a solvent, which can readily be afforded by a molar excess of one of the reactants, e.g., the alcohol. In general, the proportions of the reactants may vary over a wide range, although using greater than ten times molar excess of either reactant is uneconomical. Alternatively, any non-reactive solvent may be employed; typical solvents being such ethers as dietheyl ether, methyl ethyl ether, diisopropyl ether, dioxane, tetrahydrofurane, and the like. Other suitable solvents include such esters as ethyl acetate, amyl acetate, methyl formate and the like. While the reaction may be conducted in either aqueous or non-aqueous systems, the use of substantially anhydrous systems appears to give somewhat better results and is therefore preferred.

The esterification may be conducted at any convenient temperature. Temperatures between 0° C. and about 200° C. are readily employed. Depending on the particular system selected, the reaction temperature may readily be regulated by conducting the esterification at reflux temperature and atmospheric pressure. While the conduct of the reaction at atmospheric pressure is preferred, it may readily be carried out at subatmospheric or superatmospheric pressures if required.

Catalyst

The catalysts of the invention are the metal salts of solid acidic ion exchange resins. The resins themselves are polymeric organic acidic cation exchangers, wherein the active groups are attached to a hydrocarbon skeleton, generally a polystyrene or some similar vinylic benzene polymeric structure. The active groups may be carboxylic, nuclear sulfonic, or phenolic methylene sulfonic radicals. Other active groups which are equally effective are sulfuric, phosphoric or phosphonic acid groups. Particularly preferred resins are the strongly acidic ion exchange resins, wherein the active groups are sulfonic acid radicals —$SO_3H$. Examples of such resins are presented in the following table:

| Manufacturer | Resin | Type |
| --- | --- | --- |
| Rohm & Haas | IR-120 | Nuclear sulfonic. |
| Permutit Co | Ionac C-244 | Do. |
| Dow Chemical | Dowex 50X | Do. |
| Permutit Co | Permutit QHPF | Do. |
| Dow Chemical Co | Nalcite HCR | Do. |
| Chemical Process Co | Duolite C-3 | Methylene sulfonic. |
| Rohm & Haas | IR-100 | Do. |

The metal salts of these resins are prepared by treating the hydrogen form of the resin with an aqueous solution containing the metal ion, converting the resin into the metal or salt form.

The metals which are effective in salt form as catalysts in the process of the invention are those from Groups I through VIII of the Mendeléeff Periodic Table. Exemplary of the metals whose ion exchange resin salts have been found to be catalytically effective in the process of the reaction are copper, tin, zinc, calcium, silver, cobalt, aluminum, titanium, zirconium, barium, potassium and sodium. Of these, copper and tin salts of solid resinous acidic cation exchangers have shown the most catalytic activity.

The metal salts of the invention are employed in only catalytic amounts in the esterification process. Amounts on the order of 0.01% w. to about 5% w., based on the theoretical weight of ester to be formed, are effective, while amounts on the order of 0.1% w. to about 1% w. on the same basis are preferred.

Using such resins in the process of the invention, material advantages over conventional esterification catalysts are attained. Not only do the catalysts afford surprisingly high yields of product ester by preventing dehydration and decomposition of the reactant alcohols, but they also appear to be selective in nature, reducing such by-product formation as the etherification of the alcohol. Use of the metal ion exchange resin salt catalyst also generally gives faster reaction rates at a given temperature than other catalysts which are used for esterification of secondary alcohols. Moreover, the salts of the invention are readily prepared by conventional techniques from inexpensive and commercially available materials and are thus readily accessible without special preparation. Since they are solids, they may be employed in a variety of forms, such as dispersions, packed beds and the like, and are easily separated from the esterification system by conventional methods such as filtration, sedimentation, centrifugation, and similar methods.

The esterification process of the invention may be conducted in a batch, semi-batch or continuous manner, using techniques and equipment conventional in the chemical arts.

Products

To illustrate the unexpected advantages of the invention, its use for esterification of a particularly sensitive class of alcohols will be described. Such alcohols are those prepared by the hydrogenation of the alkyl ethers of beta-hydroxyketones. Such ether-alcohols have the general formula

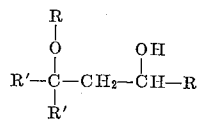

where each R is alkyl, preferably of up to 8 carbon atoms and most preferably lower alkyl of up to 4 carbon atoms, and each R' is a monovalent radical selected from the group consisting of the hydrogen atom and lower alkyl. Preparation of such keto-ethers is described in French Patent 847,407, published October 10, 1939. The ether alcohols may be generally described as beta-alkoxy secondary monohydric alkanols, and preferably have up to 10 carbon atoms in the molecule.

Representative ether-alcohols which may be esterified by the process are 2-hydroxy-4-methoxybutane; 2-hydroxy - 4 - ethoxypentane; 2 - hydroxy - 4 - methoxy - 4-methylpentane; 3 - hydroxy - 5 - isopropoxy - hexane; 2-hydroxy - 4 - propoxy - 4 - methylpentane; 2-hydroxy-4-butoxy-4-ethylhexane; and the like.

These ether-alcohols cannot be easily esterified by conventional methods because in the presence of strong acids, such as are used as esterification catalysts, they decompose. For example, in the presence of trace amounts of sulfuric acid or p-toluenesulfonic acid, the ether alcohol 2 - hydroxy - 4 - methyl - 4 - methoxypentane decomposes to mesityl oxide and methanol.

However, when these ether alcohols are reacted with organic carboxylic acids in the presence of the solid cation ion exchange resin metal salts described, they undergo esterification smoothly and in high yield to afford novel esters of the general formula

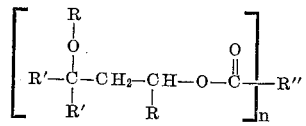

wherein each R and R' has the above significance, and R" is the n-valent organic radical of an organic n-carboxylic acid. Preferred examples of the esters are those wherein R" is an alkyl radical of up to 8 carbon atoms, and n is an integer from 1 to 2.

Typical of such esters are 2-acetyloxy-4-methoxybutane; 2 - butyroxy - 4 - ethoxypentane; 2 - acetyloxy - 4-methoxy - 4 - methylpentane; 3 - capryloxy - 4 - propoxy-4-ethylhexane; and the like. Other esters include the 2,4-dichlorophenoxy acetic ester of 2 - hydroxy - 4 - methoxy-4 - methylpentane; the di(3 - hydroxy - 5 - butoxy - 5-ethylheptane)ester of adipic acid; the benzoic acid ester of 2 - hydroxy - 4 - isopropoxybutane; and di(1 - methyl - 3-methoxy-3-methylbutyl) phthalate.

Such esters are useful for a variety of purposes. In particular, they are effective solvents for coating compositions, particularly those based on acrylic or vinylic resins. Since they are stable high-boiling liquids, the esters described are also useful for use as plasticizers in cellulose resins, acrylic resins and vinyl resins. They may also be employed as non-reactive diluents or solvents for the conduct of chemical reactions such as etherification or esterification reactions. The esters described are also effective as brake or hydraulic fluids, or for bases used in the formulation of such fluids. Moreover, these esters of 2,4-dichlorophenoxyacetic acid and 2,4,5-trichlorophenoxyacetic acid are effective weed killers.

The following examples will illustrate the procedures by which the process of the reaction may be conducted, and the novel compounds obtained thereby. These examples are merely illustrative, however, and are not to be regarded as limitations to the appended claims, since the basic teachings thereof may be varied at will, as will be understood by those skilled in the art. In the examples, the proportions are expressed in parts by weight unless otherwise indicated.

EXAMPLE I

To a 5-liter round-bottom flask fitted with a thermometer, stirrer, reflux condenser and Dean-Stark tube, were charged 1650 grams 2-hydroxy-4-methoxy-4-methylpentane, 730 grams of adipic acid, and 9.35 grams (0.5% w. theoretical ester) of the tin salt of a solid sulfonic acid-type polystyrene cation exchange resin (Dowex 50X, Ionac C–244). The adipic acid was added in four equal portions of 1-hour intervals to the refluxing mixture at about 160° C.

After two hours, 50 ml. of xylene was added to azeotrope off the product water. The mixture was held at reflux until the stoichiometric amount of water had been separated, and the mixture then cooled. The cooled mixture was filtered to remove the solid resin catalyst, and the filtrate vacuum distilled.

In this way, about 1117 grams of di(1-methyl-3-methoxy-3-methylbutyl)adipate was obtained, a 90.4% yield based on the alcohol charge. The ester was a clear light yellow liquid having a boiling point of 185° C. (0.4–0.5 mm. Hg). Infrared analysis confirmed the identification of the diester.

EXAMPLE II

In to a 5-liter round-bottom flask fitted with a thermometer, stirrer, reflux condenser and Dean-Stark tube were charged 1105 grams 2,4-dichlorophenoxyacetic acid, 825 grams of 2-hydroxy-4-methoxy-4-methylpentane, 335 grams of xylene, and 8 grams of the copper salt of solid sulfonic acid-polystyrene cation exchange resin (Ionac C–244). The mixture was refluxed for almost 5 hours, and the light ends then distilled off.

The material remaining in the flask was filtered to remove the resin catalyst and the product ester separated from the filtrate. In this way, 1645 grams of 1-methyl-3 - methoxy - 3 - methylbutyl - 2,4 - dichlorophenoxyacetate were obtained, about 97% yield based on the alcohol. The ester had a 20.6% chlorine content, compared to the 21.2% theoretically predicted.

EXAMPLE III

Into a 3-liter round-bottom flask fitted with a thermometer, stirrer, reflux condenser and Dean-Stark tube were charged 1100 grams of 2,4-dichlorophenoxyacetic acid, 637 grams of methyl isobutyl carbinol 305 grams xylene and 7.1 grams of the copper salt of a sulfonic acid polystyrene solid cation exchange resin (Permutit QHPF). The mixture was refluxed for 7 hours with azeotroping off of the product water. At the end of that time the system was cooled and filtered to remove the resin catalyst. The filtrate was then fractionally distilled to afford 1565 grams of the 1,2-dimethylpropyl-2,4-dichlorophenoxyacetate, 99.5% yield based on the alcohol charge.

EXAMPLE IV

Using the techniques of the above experiments, maleic anhydride was refluxed for 7 hours with a 25% molar excess of methyl isobutyl carbinol in two experiments, each employing 0.5% w. based on the alcohol of a different metal salt of a solid sulfonated cation exchange resin (Dowex 50W–X8). Results obtained were as follows:

| Run | Metal Salt | Conversion, percent |
|-----|-----------|---------------------|
| A   | Cu        | 62                  |
| B   | Sn        | 52                  |

Similar results were obtained when the alcohol employed was 2-hydroxy-4-methyl-4-methoxypentane.

EXAMPLE V

As in the previous experiment, a 25% molar excess of hexylene glycol (2-methyl-2,4-pentanediol) was refluxed with acetic acid in the presence of 0.5% w. of the copper salt of a solid sulfonated cation exchange resin (Dowex 50 W–X8. About 60% conversion of the alcohol to the monoacetate of hexylene glycol was obtained, the amount and nature of the product being determined by infrared spectrophotometry.

EXAMPLE VI

As in the previous experiments, a flask was charged with acetic acid, a 25% molar excess of methyl isobutyl carbinol, 0.5% w., based on the acid, of the copper salt of a solid sulfonic acid polystyrene cation exchange resin (Dowex 50W–X8) and toluene. The mixture was refluxed until the theoretical amount of water was obtained. At the end of that time, the mixture was cooled and filtered and the filtrate analyzed. About a 60% yield of 1,2-dimethylpropyl acetate was obtained.

In a similar run conducted with the tin salt of the same resin, a comparable yield of ester was obtained.

EXAMPLE VII

Using a mixture containing acetic acid, a 25% m. excess of methyl isobutyl carbinol, toluene or xylene and 2% w. catalyst, based on the theoretical amount of ester, a series of metal salt catalysts were evaluated. In each case, the alcohol-water entrainer solution containing the catalyst was heated to reflux and the acetic acid added dropwise over a one-hour period. The reaction time varied between seven and nine hours.

The catalysts were prepared by converting the H+ form of a solid sulfonated polystyrene cation exchange resin (Dowex 50W–X8) to the metal salt form. Results of the experiments are presented below.

Metal salt: Ester conversion, percent
  Sodium ------------------------------------ 41
  Cobalt ------------------------------------ 60
  Silver ------------------------------------ 63
  Zinc -------------------------------------- 53

EXAMPLE VIII

Using the above techniques, a series of metal salt catalysts were employed in the esterification of hexylene glycol with acetic acid. Salts of Dowex 50W–X8 resin were employed; these salts were the zinc, cadmium, copper and tin salts. In each experiment, the conversion to the monoacetate was comparable to those obtained in Example VII.

The ferrous salt of the resin, while effective as an esterification catalyst, gave somewhat lower conversion.

EXAMPLE IX

Using the methods of the previous examples, the monoisooctyl ester of phthalic acid was reacted in liquid phase with an excess of 2-methoxy-2-methyl-4-hydroxypentane in the presence of the copper salt of a solid sulfonated polystyrene cation exchange resin (Dowex 50W–X8). The product was isooctyl (1-methyl-3-methoxy-3-methylbutyl( phthalate in good yield.

EXAMPLE X

A measured amount of the H+ form of solid acidic cation exchange resin (Dowex 50W–X8) was placed in a chromatographic column. Through this column was poured a dilute (10%–20%) aqueous solution of cupric chloride. The solution was passed through the column until complete ion exchange had occurred, shown by the change of the column effluent from acidic to neutral. The resulting copper "salt" of the resin was dried and employed as a catalyst.

In this manner, the resin "salts" of tin, zinc calcium, silver, cobalt, aluminum, titanium, zirconium, barium, potassium and sodium are prepared from equeous solutions of their salts.

We claim as our invention:

1. The process for esterifying ether-alcohols of the formula

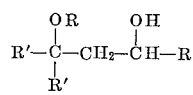

wherein R is alkyl of 1 to 8 carbon atoms, and each R' is hydrogen or lower alkyl which comprises reacting said ether-alcohol in the liquid phase at between 0° C. and about 200° C. with
  an organic acid compound of the group consisting of unsubstituted alkonic and unsubstituted aromatic carboxylic acids of 2 to 8 carbon atoms having no more than 2 carboxyl groups, and anhydrides of said acids,
in the presence of a solid cation exchange resin,
  in which the cation is a cation of copper, tin, zinc, calcium, silver, cobalt, aluminum, titanium, zirconium, barium, potassium, or sodium.

2. The process of claim 1 wherein 2-hydroxy-4-methyl-4-methoxy-pentane is esterified using a salt of a sulfonic acid-type cation exchange resin as the catalyst at reflux temperature and atmospheric pressure.

3. A process in accordance with claim 1 wherein an alkanoic acid is reacted with the ether-alcohol at reflux temperature.

4. A process in accordance with claim 3 wherein adipic acid is reacted with the ether-alcohol at rebux temperature.

5. A process in accordance with claim 2 wherein a copper salt of the cation exchange resin is used as catalyst at reflux temperature.

6. A process in accordance with claim 2 wherein a zinc salt of the cation exchange resin is used as catalyst at reflux temperature.

7. The process for esterifying ether-alcohols of the formula

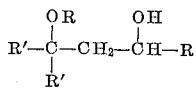

wherein R is alkyl of 1 to 8 carbon atoms, and each R' is hydrogen or lower alkyl which comprises reacting said ether-alcohol in the liquid phase at between 0° C. and about 200° C. with
  2,4-dichlorophenoxyacetic acid,
in the presence of a solid cation exchange resin,
  in which the cation is a cation of copper, tin, zinc, calcium, silver, cobalt, aluminum, titanium, zirconium, barium, potassium, or sodium.

References Cited by the Examiner
UNITED STATES PATENTS

| | | | |
|---|---|---|---|
| 1,706,639 | 3/1929 | Van Schaack et al. | 260—485 X |
| 2,570,037 | 10/1951 | Smith et al. | 260—485 |
| 2,629,735 | 2/1953 | Cottle et al. | 260—485 X |
| 2,746,938 | 5/1956 | Ehm et al. | 260—488 X |
| 2,928,853 | 3/1960 | Bond | 260—410.9 |
| 2,935,534 | 5/1960 | Hoaglin et al. | 260—486 X |
| 3,056,818 | 10/1962 | Werber | 260—485 |
| 3,057,824 | 10/1962 | Bras et al. | 260—485 |
| 3,201,357 | 8/1965 | Fang et al. | 260—2.2 |

OTHER REFERENCES

Rohm & Haas Co. pamphlet "Amberlite in Exchange," September 1953, page 10 relied on.

Pudovik et al.: Chemical Abstracts, 42, 6312f, 1948.

Groggins: "Unit Processes in Organic Chemistry" (1952), pp. 603 and 607–609, 4th ed.

Groggins: "Unit Processes in Organic Synthesis," McGraw-Hill (1952), page 608.

LORRAINE A. WEINBERGER, *Primary Examiner.*

H. G. MOORE, R. K. JACKSON, *Examiners.*

R. E. MASSA, *Assistant Examiner.*